March 17, 1964 S. COPPICK 3,125,621
MODIFIED AMINOPLAST RESIN FOAMS AND PROCESS
OF MANUFACTURE THEREOF
Filed Feb. 8, 1961
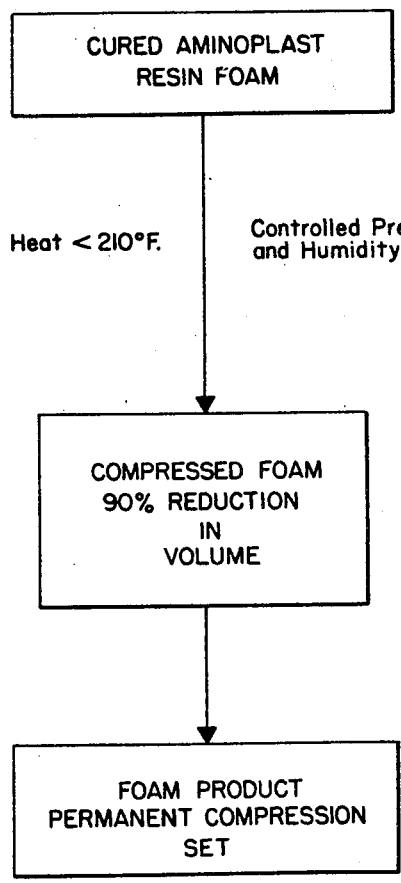
INVENTOR.
SYDNEY COPPICK
BY
AGENT

United States Patent Office 3,125,621
Patented Mar. 17, 1964

3,125,621
MODIFIED AMINOPLAST RESIN FOAMS AND PROCESS OF MANUFACTURE THEREOF
Sydney Coppick, Ridley Park, Pa., assignor to Scott Paper Company, Philadelphia, Pa., a corporation of Pennsylvania
Filed Feb. 8, 1961, Ser. No. 87,743
5 Claims. (Cl. 264—321)

The present invention relates to foamed aminoplast resins and more particularly to a process of modifying such resin foams under controlled conditions of pressure and temperature in order that there may be realized products of superior physical characteristics and of enhanced value.

The past few years have seen an increased interest in the development of foamable synthetic resinous materials whose cellular structures offer convenient and satisfactory substitutes for an unlimited variety of natural spongeous bodies. The foamed polystyrenes, polyurethanes, alkyds and reconstituted celluloses are well known to the art. More recently attention has been directed to a class of aminoplast resin foams, the production of which involves some unusual techniques. For example, a urea-formaldehyde prepolymer, formed by condensing urea and formaldehyde in an approximate 1 to 2 molar ratio, may be foamed by addition to a cellulated mass of a surface active agent, water and an acid catalyst such as sulfuric acid. Regulation of the density of the cellulated matrix by aeration thereof enables control of the density of the resin foam within limits of from 0.2 to 0.8 pound per cubic foot. Additionally it has been noted that the degree of aeration and matrix agitation affects the fineness of the ultimate foam which may leave as many as $10^5$ cells per cubic centimeter. Upon curing there results a reticulated structure whose skeletal configuration is composed of rod-like strands arranged in a three-dimensional network consisting of two continuous phases with unique geometry and having spacings between the strands corresponding in spacial dimensions with a foamed cellular product of $10^5$ cells per cc. Melamine-formaldehyde resins, mixed melamine-urea-thiourea condensation products with formaldehyde and phenol-formaldehyde resins may be similarly processed to produce lightweight foams. Other foamed resins are disclosed in U.S. Patents Nos. 2,076,295, 2,273,367, 2,384,387, 2,559,891 and 2,813,780, British Patent No. 768,562, Italian Patent No. 590,887, Belgian Patents Nos. 527,694, 565,130 and 580,849.

The foamed resins, described above, are notably non-absorptive. Water, when applied to the foam surface collects in droplets thereon rather than wetting and penetrating the interior of the foam. Attempts have been made to render these foams more water absorbent by treatment with surfactants of different types but such efforts have not achieved any real degree of success.

It is a primary object of the present invention to provide a controlled process for the compression and thermal setting aminoplast resin foam in order to obtain therefrom a hydrophilic felt-like sheet of modified softness and flexibility.

It is another object of my invention to provide for the selective modification of the physical characteristics of an aminoplast resin foam accompanied by volume concentration in excess of 50%.

Other objects and advantages of this invention will be readily apparent from the following detailed description of certain preferred embodiments thereof.

I have discovered that under carefully controlled conditions of pressure, time and temperature a reticulated foam structure of an aminoplast resin, hydrophobic and non-wettable, can be converted into a hydrophilic wettable spongiform body. Additionally such physical treatment will impart fibrous characteristics to the foam body, transforming it into a soft, flexible felt-like sheet. Control of the conditions under which material compression is effected are critical. Resin fusion and the formation of a coalesced polymer skin or surface for the foam body, even though beneficial from the standpoint of integral reinforcement is to be avoided.

The invention is best understood by reference to the drawing wherein:

The area represented as "Cured Aminoplast Resin Foam" depicts the foam subjected to processing steps needed to prepare the hydrophobic foam for conversion to the permanently compressed hydrophilic state;

The area represented as "Compressed Foam 90% Reduction in Volume" depicts the foam which in its original form in convenient shapes such as slabs, blocks and sheets having a certain humidity (or moisture) content is fed between two felt-like surfaces at a temperature of less than 210° F. to effect according to the coacting conditions of temperature, humidity, and particular pressure surfaces the desired reduction in volume of the original foam shape;

The area represented by "Foam Product Permanent Compression Set" depicts the final foam product exhibiting in the final form the desired properties.

In the present invention the three-dimensional strand structure is uniformly collapsed by breaking, bending and permanent deformation of the strands so that they lie substantially in a plane at right angles to the direction of the compressing force. To carry out this process most effectively I have discovered that a uniform temperature throughout the mass of the structure is desirable to avoid a non-uniformity of under-compression and adverse geometry in the interior of the sheet, and over-plasticization of the surface, resulting in coalescense of strands with consequent skin formation. Furthermore the time, temperature, pressure relationship has been discovered to be very important in bringing about the desirable effect while avoiding those undesirable ones. In the preferred embodiment of this invention it is essential to impart a permanent set into the structural strand elements of the reticulated three-dimensional structure so that the strands may be permanently bent and otherwise distorted into the plane of the resulting sheet, without reducing them to such a plastic or fluid state that they are fused together to give a hard boardy material or have sufficient surface fusion to form a skin or shell which will impede absorption. To this end I prefer to use high pressure and relatively low but uniform temperature of relatively long duration to insure uniform penetration. By such means the strands assume a distortable or very highly viscous character without approaching a tacky state. To effect a permanent flow or non-returnable distortion in the strands at the softened but highly viscous state it is necessary to apply pressure for appreciable time duration in the area in which the elastic limit has been exceeded and to allow for fixation of the strained strands in their distorted state, since otherwise their residual resilient properties would tend toward a partial or complete recovery to the original state. On the other hand the permanent distortion properties may be enhanced by proceeding to a more softened or less viscous state where pressures for short durations of time will effect a non-recoverable collapse of the structure. However, in these latter cases the temperatures required are such that a tackiness of the strands results and their points of contact in the sheet are fused together with the resulting loss of softness, and the surfaces of the felted sheet are fused to the extent that water penetration is impeded.

The following examples are illustrative of the invention:

Example I

Preparation of a labile aminoplast resin, particularly adapted for thermal compression setting, involved the condensation of 1,200 parts by weight of urea, 1,165 parts of para formaldehyde, 2,206 parts of water, 190 parts of methanol, 104 parts of urotropin (hexamethylenetetramine) and 10 parts of 4 molar sodium hydroxide solution. The reactants were placed in a reaction flask equipped with a reflux condenser, a thermometer and a mechanical stirrer. The flask was heated under agitation to reflux temperature of about 98° C. and contained under reflux for 15 minutes. Then 40 parts of 10% sodium hydroxide solution were added to stop the reaction and the resulting syrup was cooled to room temperature. The product had a viscosity of 55 centistokes at 20° C.

To 52 parts of the above resin syrup there was added 1 part of urea, 5 parts of 34% Teepol 610 (a sodium secondary alkyl sulfate produced by Shell Chemical Corporation) and 42 parts of water.

The diluted resin solution containing the surfactant and a hardening agent in the form of a solution containing 7.5 parts of 85% phosphoric acid, 2.0 parts of urea and 90 parts of water were blended in a foaming nozzle by pumping the resin solution and the hardening agent into the mixing zone in the proportion of 2 volumes of resin to 1 volume of hardener. Compressed air was admitted to the mixture which proceeded at high velocities over a tortuous path containing obstacles to convert the resin into a fine foam. This was collected in wire mesh containers and placed in a circulating air curing oven, with air circulation rate of 1000 cubic feet per minute for 3 hours at a temperature of 85° C. and 42% relative humidity. A moist, cured, reticulated three-dimensional strand structure was obtained. This was dried in the same oven at 5% relative humidity and 60° C. for an additional period of 4 hours. A moisture plasticized structure with a density of 0.5 pound per cubic foot was obtained, having a very fine strand structure.

This cured and dried reticulated structure composed of two continuous phases was cut on a band saw to give slabs 1" thick. These slabs were placed between blotters and fed to the Nobel and Wood dryer and held between the dryer surface and the rotating felt for a single period of one revolution with a duration of 2.25 minutes, with the water temperature inside the drum at 200° F. The final product was a soft pad $\frac{1}{16}$" thick. This pad had a density of 8.0 lbs./ft.$^3$ or a bulk of 7.8 cc./gm.

A 1 cc. portion of water was placed on the pad and the three time taken for complete absorption.

| Material: | Absorbency (seconds) |
|---|---|
| Compressed felted pad | 22. |
| Original uncompressed slab | Greater than 7200. |

Example II

A pad was made as in Example I with the exception that the Nobel and Wood drum dryer temperature was maintained at 190° F.

The pad had the following properties:

| | |
|---|---|
| Basic weight | 93.6 lbs./ream of 2880 ft.$^2$. |
| Caliper | 45.0 thousandths of an inch. |
| Absorbency of pad | 25 seconds. |
| Absorbency (control slab) | Greater than 18,000 seconds. |

Example III

A pad was made as in Example I with the exception that the Nobel and Wood drum dryer temperature was 210° F. Absorbency: 15 seconds.

Example IV

A pad was made as in Example I with the dryer temperature at 170° F.

| | |
|---|---|
| Density of pad | 4.0 lbs./ft.$^3$. |
| Thickness of pad | $\frac{1}{8}$ inch. |
| Absorbency | 35 seconds. |

Example V

A pad was made as in Example I with the exception that the drum temperature was 130° F.

| | |
|---|---|
| Density of pad | 2.0 lbs./ft.$^3$. |
| Thickness of pad | $\frac{1}{4}$ inch. |
| Absorbency | 115 seconds. |

Example VI

A reticulated structure was prepared as in Example I. Slabs with a thickness of $\frac{1}{4}$" were cut with a band saw and compressed for 2.25 minutes on the Nobel and Wood dryer at a drum temperature of 120° F. The resulting pad had the following properties:

| | |
|---|---|
| Basic weight | 25 lbs./ream of 2880 sq. ft. |
| Caliper | 17 thousandths of inch. |
| Bulk | 10.25 cc./gm. |
| Density | 6.1 lbs./ft.$^3$. |
| Absorbency (1 cc.) | 70 seconds. |

Example VII

A pad was made exactly as in Example VI with the exception that the Nobel and Wood drum temperature was 65° F. The resulting pad had the following properties:

| | |
|---|---|
| Basic weight | 24.0 lbs./ream of 2880 sq. ft. |
| Caliper | 187 thousandths of inch. |
| Bulk | 112 cc./gm. |
| Density | 0.55 lb./ft.$^3$. |
| Absorbency | Greater than 1000 seconds. |

It is apparent from the above examples that the temperature at which the compression is accomplished has a large effect on the absorbency of the resulting pad.

Example VIII

Slabs were compressed on the Nobel and Wood dryer at various temperatures for various times. The results were as follows:

| | | | | | |
|---|---|---|---|---|---|
| Original Slab Thickness (inches) | $\frac{1}{2}$ | $\frac{1}{2}$ | $\frac{1}{2}$ | 1 | 1 |
| Temperature of Drum, °F | 195 | 220 | 220 | 220 | 220 |
| Time of Compression (min.) | 2.25 | 2.25 | 4.5 | 2.25 | 4.5 |
| Final Caliper, Thousandth inch | 22 | 25 | 26 | 70 | 73 |
| Basic Weight, lbs./ream | 40.2 | 44.2 | 40.1 | 94.2 | 95.7 |
| Bulk, cc./gm | 8.3 | 8.6 | 9.8 | 11.5 | 11.5 |
| Density, #/ft.$^3$ | 7.5 | 7.25 | 6.57 | 5.41 | 5.41 |
| Absorbency (second) | 17 | 15 | 17 | 33 | 28 |

It is apparent from the above example that under the preferred conditions of this invention the duration of the compression is not critical.

Example IX

Slabs were compressed as in Example VIII with the exception that the blotters used contained various amounts of moisture.

| | | | | | | | | | |
|---|---|---|---|---|---|---|---|---|---|
| Original Slab Thickness, inches | $\frac{7}{8}$ | $\frac{7}{8}$ | $\frac{7}{8}$ | $\frac{7}{8}$ | $\frac{7}{8}$ | $\frac{7}{8}$ | $\frac{7}{8}$ | $\frac{7}{8}$ | $\frac{7}{8}$ |
| Temperature of Drum, °F | 90 | 125 | 140 | 160 | 220 | 220 | 220 | 220 | 220 |
| Time of Compression (min.) | 2.25 | 2.25 | 2.25 | 2.25 | 2.25 | 4.5 | 2.25 | 2.25 | 2.25 |
| Moisture Content of Blotters, percent | 5 | 5 | 5 | 5 | 5 | 5 | 16.5 | 8.8 | 15.4 |
| Absorbency (seconds): | | | | | | | | | |
| Felt side | 720 | | 140 | 30 | 30 | 22 | 75 | 25 | 240 |
| Drum side | | 17 | 15 | 13 | 22 | 16 | 480 | 25 | 3,000 |

It is apparent from the above example that not only the temperature but also the moisture content has an effect on the absorbency of the resulting pad. In the cases where moisture greater than that of the normal "air dry" condition was used it was observed that the pad had a harsh boardy feel and had a thin impervious skin on its surface.

*Example X*

⅞" slabs of reticulated structures similar to Example I were compressed on the Nobel and Wood dryer for various periods. The results were as follows:

| | | | |
|---|---|---|---|
| Temperature, °F | 220 | 220 | 220 |
| Time (minutes) | 2.25 | 10.0 | 30 |
| Moisture content, percent | 5 | 5 | 5 |
| Absorbency (seconds): | | | |
| Felt side | 30 | 15 | 45 |
| Dryer side | 30 | 20 | 20 |

It is further indicated in these examples that so long as the moisture content is low, the plasticity of the material is such that at these preferred temperatures, the residence time is not critical in the softness and absorbency of the resulting pad.

It is apparent from the foregoing results that the softness and absorbency of a foamed aminoplast resin are materially benefited by the compression and thermal set contemplated by my invention. It is further apparent that there exists a wide range of combinations of operating conditions such as degree of compression, foam temperature during compression, humidity control, and the like which will enable attainment of the desired modification of physical properties of the treated foam.

The compressed foam of our invention is not only softened and given hydrophilic properties but is also strengthened through its conversion into a form approximating a felted material adopted for use in surgical dressings, catamenial pads, and absorbent fillers where compliance, resilience and hydrophilicity are most desirable characteristics.

What I claim is:

1. The process of improving the physical characteristics of a low density labile, cured aminoplast resin foam which comprises exerting a uniform compressive force against such foam to reduce the volume thereof from 50 to 95% and to exceed the elastic limit of the structural elements of the foam without material destruction, such compression being effected at a temperature between 125° and 210° F., maintaining the moisture content of the compressed foam below 10% by having a porous felt-like material in contact with the external surfaces of said foam when said foam is subjected to pressure, and maintaining the compression of said foam for a period less than 5 minutes to achieve a permanent set of the foam material in its compressed state.

2. The process of claim 1 in which the aminoplast resin is a urea-formaldehyde resin.

3. The process of improving the softness and hydrophilicity of a low density labile, cured aminoplast resin foam which comprises heating said foam to a temperature of from 125° to 210° F., exerting a uniform compressive force against said heated foam to reduce the volume thereof from 50 to 95% and to exceed the elastic limit of the structural elements of the foam without material destruction, maintaining the moisture content of the compressed foam below 10% by having a porous felt-like material in contact with the external surfaces of said foam when said foam is subjected to pressure and maintaining the compression of said foam for at least 2 minutes to achieve a permanent set of the foam material in its compressed state.

4. The process of claim 3 in which the aminoplast resin is a urea-formaldehyde resin.

5. A hydrophilic aminoplast resin foam produced by the process defined in claim 1.

References Cited in the file of this patent

UNITED STATES PATENTS 2,384,387    Meyer _____ Sept. 4, 1945